Nov. 3, 1942.   R. G. TILTON   2,301,154
MOVING STAIRWAY DRIVE SHAFT ALIGNMENT
Filed Nov. 15, 1941   3 Sheets-Sheet 1

Russell George Tilton   INVENTOR
BY   ATTORNEY

Nov. 3, 1942.  R. G. TILTON  2,301,154
MOVING STAIRWAY DRIVE SHAFT ALIGNMENT
Filed Nov. 15, 1941  3 Sheets-Sheet 2

Russell George Tilton  INVENTOR
BY  ATTORNEY

Nov. 3, 1942.  R. G. TILTON  2,301,154
MOVING STAIRWAY DRIVE SHAFT ALIGNMENT
Filed Nov. 15, 1941  3 Sheets-Sheet 3
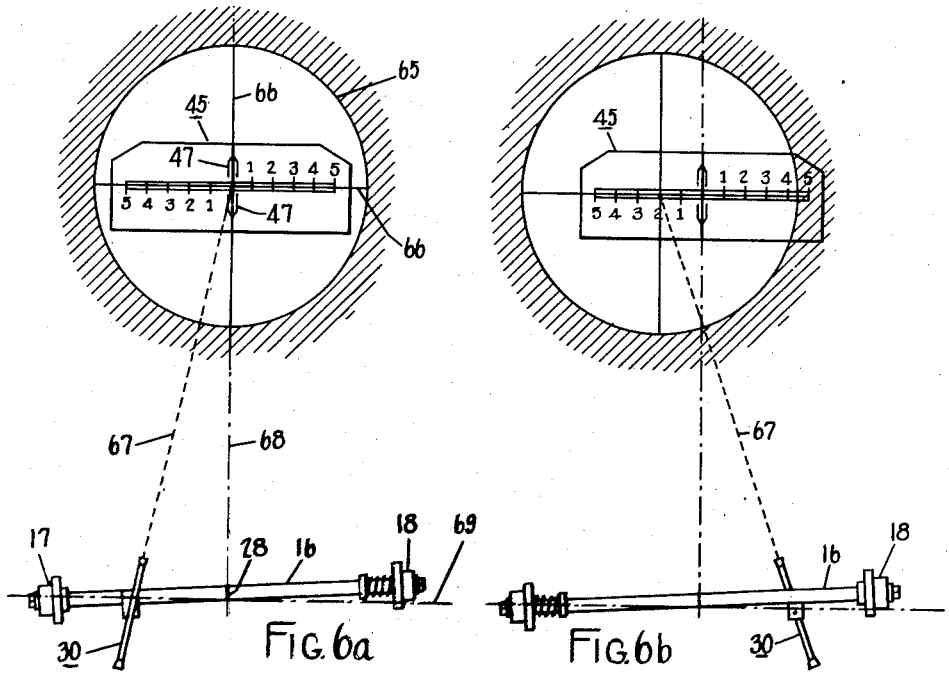
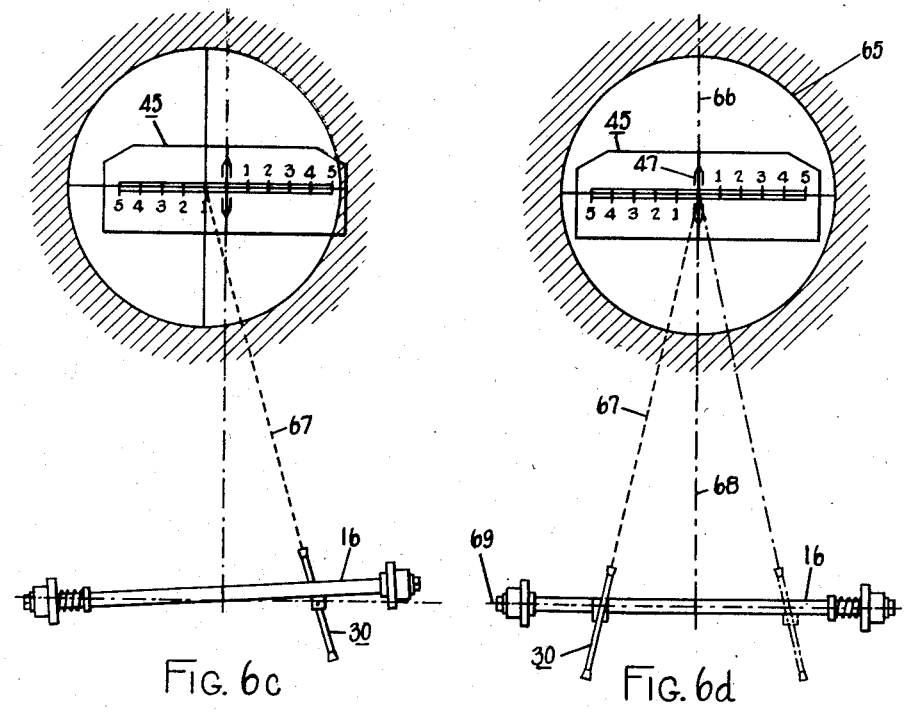
Russell George Tilton  INVENTOR
BY Matt… Bradley  ATTORNEY Patented Nov. 3, 1942

2,301,154

UNITED STATES PATENT OFFICE 2,301,154

MOVING STAIRWAY DRIVE SHAFT ALIGNMENT

Russell George Tilton, Mountain Lakes, N. J., assignor to Otis Elevator Company, New York, N. Y., a corporation of New Jersey Application November 15, 1941, Serial No. 419,255

2 Claims. (Cl. 33—46)

The invention relates to the method of and apparatus for determining the proper position of the drive shaft of a moving stairway.

Moving stairways have a drive shaft at the upper end upon which the driving sprockets for the running gear chains are mounted. This shaft is at right angles to the line of movement of the stairway. It would be very objectionable if this shaft were not in its proper angular relationship to the line of movement. Such misalignment would cause distortion of the steps, making the stairway work hard and causing the step wheels to wear against the sides of the tracks and the rubbing or catching of the tread cleats of the steps on the combplate. It would also result in rapid wear of the running gear chains and driving sprockets. In addition, such misalignment would result in considerable noise in operation. It is important therefore that the drive shaft be mounted in proper position when the stairway is constructed.

One object of the invention as applied to moving stairways is to provide a simple and reliable method of squaring the main drive shaft with the line of travel of the stairway.

Another object of the invention as applied to moving stairways is to provide drive shaft position determining mechanism which is of simple construction, easy to use, and with which accurate results are assured.

In carrying out the invention according to the arrangement which will be described, a crossbar is provided for extending between the driving sprockets on the moving stairway drive shaft in a definite position with respect thereto. This bar has a sight near one end thereof. A target is positioned down the incline of the stairway truss and is provided with a horizontal scale, the center point of which is in a vertical plane passing through the center line of the stairway. The sight is swingable to enable it to be pointed on the center of the target. After the sight has been set on the target center, the bar is turned over so that the sight points on the target from the other side of the stairway and the point on the target scale at which the sight aims is noted. The sight is then reset to aim at a point halfway between the target center and the point at which the sight aimed when the bar was swung over. The drive shaft is then adjusted so that the sight in its last position aims at the target center. The shaft is then square with the stairway center line.

A general idea of the invention, the mode of carrying it out which is at present preferred, and the various features and advantages thereof can be gained from the above statements. Other features and advantages of the invention will be apparent from the following description and appended claims.

In the drawings:

Figures 6a, 6b, 6c and 6d are schematic views to illustrate various steps in setting the drive shaft.

Figure 1:
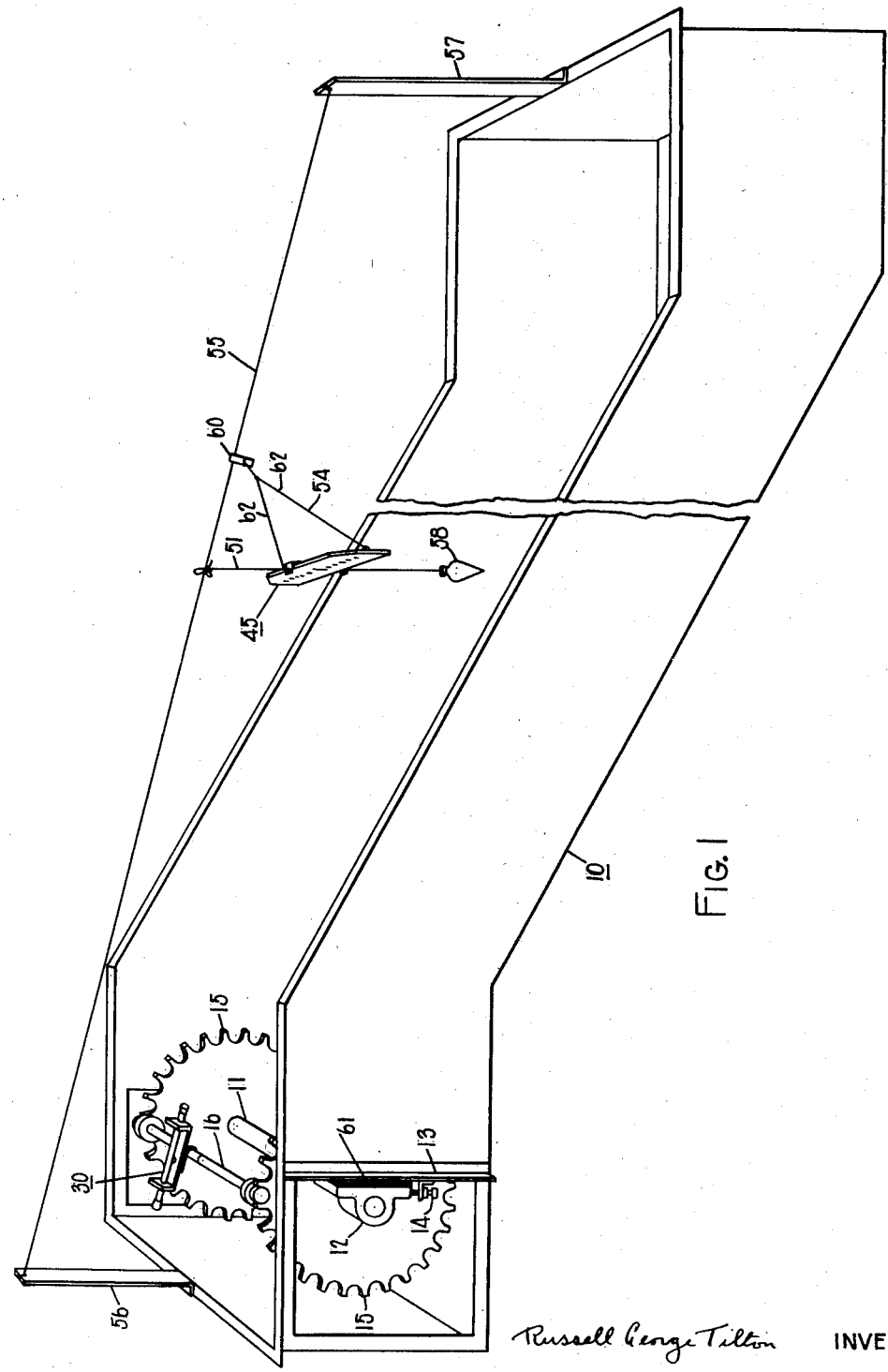
Figure 1 is a schematic representation of a moving stairway truss with the drive shaft and sprockets in place, illustrating the application of the invention thereto.

Referring to Figure 1, the stairway truss 10 for convenience is for the most part illustrated in outline. At the upper end of the stairway is the drive shaft 11. This shaft is rotatably mounted at each end in a bearing block 12 secured to a vertical angle member 13 of the trusswork. The bearing block is mounted so as to be shiftable vertically as for example by an adjusting screw 14 in a bracket secured to angle member 13. The driving sprockets 15 for the running gear chains are secured to the drive shaft, one at each end thereof, the sprockets being located so that their teeth are in axial alignment. Thus the gauge bar 16 when positioned in aligned throats between sprocket teeth is parallel with the drive shaft.

Figure 2:
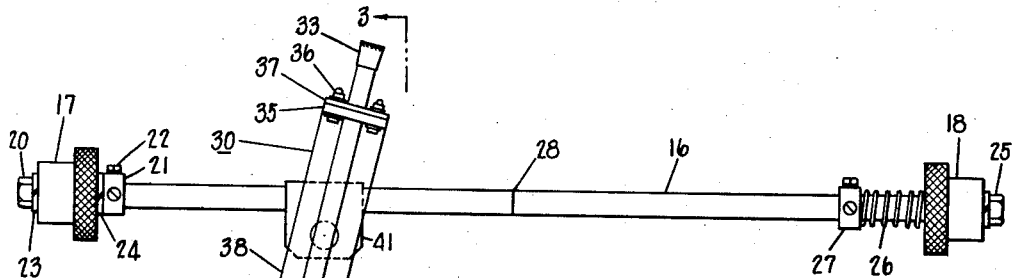
Figure 2 is a plan view of the gauge bar and sight shown in Figure 1.
Figure 3:
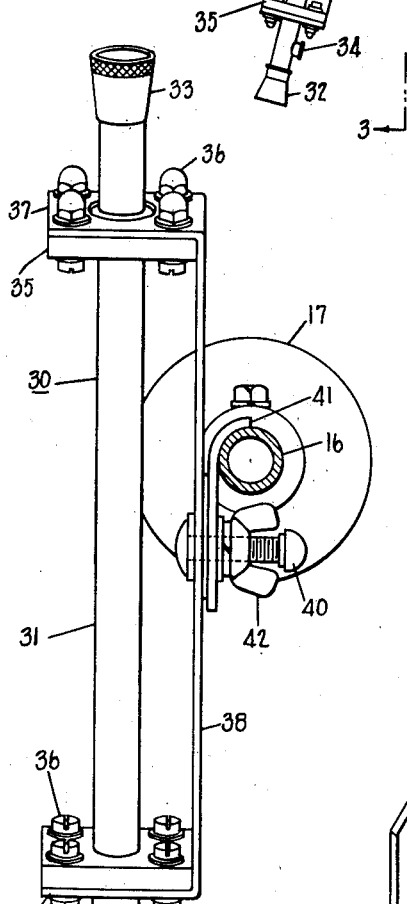
Figure 3 is an enlarged view of the sight on the gauge bar, taken along the line 3—3 of Figure 2.
Figure 4:
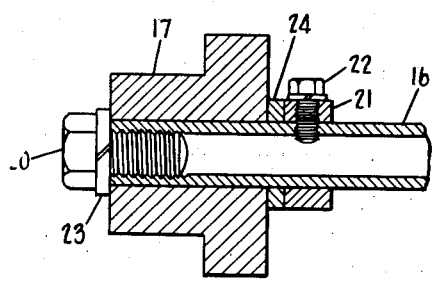
Figure 4 is a sectional detail of the fixed positioning spool on one end of the gauge bar.

The construction of the gauge bar is illustrated in Figures 2, 3 and 4. The bar is made of tubing to minimize weight and is of a length to span the sprocket wheels for the particular size stairway. Locating spools 17 and 18 are provided on the bar, one at each end thereof. The position of spool 17 on the left hand end of the bar as viewed in Figure 2 is fixed. It is held in position by a screw 20, secured in the threaded end of the bar and a collar 21 secured on the bar by a screw 22. Lock washers 23 and 24 are provided between the spool and the screw 20 and collar 21 respectively. Spool 18 is slidable on the bar, being held against screw 25 on the right hand end of the bar by a compression spring 26 arranged on the bar between the spool and the collar 27 secured to the bar. A line 28 is marked on the bar to define the mid point between the spools.

To the left of the mid point 28 and mounted on the bar is a sight 30. This sight is illustrated as of a telescopic type, a telescopic sight with cross-hairs being preferred. A three or four power telescopic sight is considered satisfactory. The sight illustrated comprises a barrel 31, the viewing end of which is provided with an eye shade 32 and the other end with a focusing collar 33. A micrometer adjusting screw 34 is provided near the viewing end of the sight. The barrel is mounted in rubber blocks 35 secured as by screws 36 to flanges 37 of a mounting bracket 38. The bracket is pivotally secured by a screw 40 to a plate 41, secured as by welding to the bar 16. A wing nut 42 is provided for tightening the bracket on the plate to hold the sight in an adjusted position.

Figure 5:
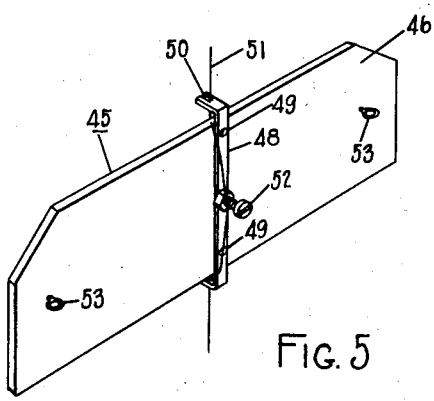
Figure 5 is a view in perspective of the rear of the target.

The target 45 is in the form of a board 46 having a horizontal scale arranged thereon as shown in Figures 6. In the arrangement illustrated, the target scale is provided with five main divisions on each side of a centerpoint, the centerpoint being arranged within brackets 47 extending vertically from each side of the scale. The main divisions are sub-divided but for convenience these sub-divisions are not indicated. As illustrated in Figure 5, the target has a vertical bracket 48 secured to the back thereof intermediate the ends of the target as by screws 49. Each end of the bracket is provided with a slot 50 for locating the suspending line 51 for the target. Intermediate the ends of the bracket is a screw 52 around which the suspending line is wrapped to suspend the target. Near the ends of the target are two eye screws 53 to which a tail line 54 (see Figure 1) is secured.

To line up the drive shaft 11 it is first levelled, adjustments being made by means of screws 14. The average center line of the stairway is determined by measurements from the sides of the trusswork and a center line wire 55 is run from a bracket 56 secured to the trusswork at the top of the stairway down the incline to the bottom of the trusswork. The lower end of the center line wire may be secured to a similar bracket 57 secured to the trusswork, although this bracket may be omitted and the wire secured to the trusswork itself. The target is then suspended from the center line wire with its face toward the drive shaft at a point about twenty feet down the incline, the lower end of the suspending line 51 being provided with a plumb bob 58 to maintain the center of the target scale in a vertical plane through the center line of the stairway. A clip 60 on the end of the tail line is attached to the center line wire at a point down the incline from suspending line 51, the portions 62 of the tail line being of the same length to position the target substantially at right angles to the vertical plane through the stairway center line.

Gauge bar 16 is placed on the sprocket wheels at a point directly above the main drive shaft with the sight to the left of the center line as viewed from the upper end of the stairway and pointing toward the target. In placing the gauge bar on the sprocket wheels, the spool 18 is put in place first and the spring 26 compressed until the spool 17 goes into place. The line of sight is centered within the barrel by means of adjusting screw 34 and if the cross-hairs are not vertical and horizontal the barrel is turned in the rubber mountings until this position is obtained.

Focus collar 33 is then turned until the target figures are in focus.

To facilitate an understanding of further steps in squaring the drive shaft, reference may now be had to Figures 6. In each of the figures, the target is shown within an enlarged circle 65 with the cross-hairs 66 as indicative of that which is seen when looking through the sight. The sight on the crossbar is shown pointing at the target and the line of sight indicated by dotted line 67. Dot and dash line 68 represents the center line of the stairway while dot and dash line 69 is at right angles thereto at the drive shaft. After the above preparations have been completed, the sight is aimed directly at the centerpoint of the target scale, as indicated in Figure 6a. This is done by tapping on the bracket 38 and tilting the gauge bar until the proper position is obtained. Wing nut 42 is now tightened to hold the bracket in this position. Next the crossbar is inverted, end over end. This places the sight to the right of the center line and under the bar. The bar is then tilted until the horizontal cross-hair of the sight lines up with the horizontal axis of the target, as shown in Figure 6b. If the sight now points exactly on the center of the target, the main drive shaft is properly squared. However, should it point off center the sight is shifted until it aims at a point mid-way between the first point and the center of the target. Assuming that the drive shaft is out of position to the extent that the vertical cross-hair falls on main division 2 to the left of the target center as shown in Figure 6b, the bracket 38 is tapped until the vertical cross-hair registers with the point 1 to the left of the target center, as shown in Figure 6c, and the wing nut 42 is tightened to hold the bracket in place.

The position of the main drive shaft is now adjusted by inserting under or removing from the bearing blocks spacing shims 61 until the sight points on the exact center of the target, as shown in Figure 6d with the sight in dot dash lines. This places the main drive shaft square with the line of travel of the stairway. The scale divisions on the target may be related to the thickness of the bearing block shims so that it is possible to determine from the reading on the scale at the step represented by Figure 6c substantially the amount of shimming required to bring the shaft square.

It is preferred to check this setting and this may be done by reinverting the bar as shown in full lines in Figure 6d. If the sight in reinverted position points at the center of the target, this shows that the drive shaft is in proper position. The setting is considered satisfactory if the vertical cross-hair of the sight falls within the brackets 47 for the zero point of the target. However, should the vertical cross-hair fall on a point outside the bracket, the sight is reaimed midway between this point and zero, and the bearing blocks reshimmed to bring the sight to the target center. This reaiming may be done by means of the adjusting screw 34. This setting may be checked by again inverting the bar to see if the vertical cross-hair of the sight falls within the brackets 47 of the target.

As many changes could be made in the above apparatus and various changes in procedure could be made without departing from the scope of the invention, it is intended that all matter contained in the above description or shown in the accompanying drawings shall be interpreted as illustrative and not in a limiting sense.

What is claimed is:

1. Mechanism for squaring the main drive shaft of a moving stairway with the longitudinal center of the stairway, said drive shaft having axially aligned sprockets, one at each end thereof, and being mounted in adjustable bearing blocks, said mechanism comprising; a line extending down the longitudinal center of the stairway; a target having a scale extending with equal spaces on each side of a zero point; a plumb line suspending said target through its zero point from said center line at a point down the incline of the stairway; connections for maintaining the target crosswise of the stairway; a gauge bar having a spool at each end thereof for fitting into the throats between aligned teeth of the sprockets; a telescopic sight; a bracket supporting said sight; a plate secured to said bar to one side of the mid point thereof; and a bolt pivotally securing said bracket to said plate to enable the sight to be aimed at the zero point of the target and tightened in that position, said bar being turnable end over end on the sprockets to ascertain whether the sight points at the zero point on the target scale.

2. Mechanism for squaring the main drive shaft of a moving stairway with the center line of the stairway, said drive shaft having axially aligned sprockets, one at each end thereof, and being mounted in bearing blocks provided with shims for adjusting the position of the drive shaft, said mechanism comprising; a wire extending down the center line of the stairway; a target having a scale extending with equal spaces on each side of a central zero point; a plumb line suspending said target through its zero point from said center line wire at a point down the incline of the stairway; a tail line connecting the sides of said target to said center line wire to maintain the target crosswise of the stairway; a gauge bar having a spool at each end thereof for fitting into the throats between aligned teeth of the sprockets with either end of the gauge bar at either sprocket, one of said spools being held in place by a spring yieldable to facilitate mounting the bar on the sprockets; a telescopic sight having a micrometer adjustment; a bracket for supporting said sight for rotatable movement therein to properly position the cross hairs of the sight; a plate secured to said bar to one side of the mid point thereof; and a bolt pivotally securing said bracket to said plate and having a nut for tightening said bracket in adjusted position.

RUSSELL GEORGE TILTON.